United States Patent [19]

Belmuth et al.

[11] 3,891,378

[45] June 24, 1975

[54] APPARATUS FOR MOLDING A BRASSIERE CUP SHAPE

[76] Inventors: Harold Belmuth, 8 Highwood Ln., Westport, Conn. 06880; Alfred R. Leto, 1541 Parker St., Springfield, Mass. 01129

[22] Filed: May 9, 1974

[21] Appl. No.: 468,242

[52] U.S. Cl. .................. 425/398; 425/DIG. 102; 425/DIG. 110; 425/412
[51] Int. Cl.² ................ B29C 17/00; B29C 1/00
[58] Field of Search .......... 425/384, 398, 399, 400, 425/401, 403, 469, 144, 160, 351, 404, 407, DIG. 102, DIG. 110, 404, 412; 264/322, 327, 388, 437

[56] References Cited
UNITED STATES PATENTS
3,597,800   8/1971   Silverman ..................... 425/412

*Primary Examiner*—Francis S. Husar
*Assistant Examiner*—Robert J. Charvat
*Attorney, Agent, or Firm*—Bauer & Amer

[57] ABSTRACT

In the molding of a brassiere cup shape in a plastic fabric; an improved technique or chilling and thereby stabilizing the size of the molded shape without at the same time lowering the temperature of the molding members and thereby interfering with their ability to function effectively during subsequent molding operation.

1 Claim, 3 Drawing Figures

PATENTED JUN 24 1975

3,891,378

APPARATUS FOR MOLDING A BRASSIERE CUP SHAPE

The present invention generally relates to an improved apparatus for molding a brassiere cup shape, and more particularly to an improvement for achieving accurately sized molded shapes for use in the manufacture of brassieres.

During the molding of plastic fabric into brassiere cup shapes, the fabric is stretched during the closing of the male mold within the female mold cavity. The shaping produced by the closed molds is then permanently imparted to the fabric by the application of heat. However, the molds are parted before the shaped fabric has stabilized and, as a consequence, the forces that are induced in the fabric, particularly in its peripheral edges during the stretching thereof, cause undesirable size changes in the molded shape. As a result, it is difficult to maintain the size tolerances required to meet commercial standards for the end product. It is not an effective solution to introduce a cooling fluid or refrigerant for heat transfer from the molded fabric while the molds are closed since this technique has the undesirable effect of significantly chilling the molding or shaping surfaces of the molding members. Prior to subsequent molding, it would be necessary to restore the proper molding temperatures to the molding members before they could be effective.

Broadly, it is an object of the present invention to provide an improved technique for stabilizing, by chilling, the molded shape in a plastic fabric, and thereby overcoming the foregoing and other shortcomings of the prior art. Specifically, it is an object to reduce the temperature of the shaped fabric, and thereby stabilize the size thereof, but without significantly reducing the temperature of the molding or shaping surfaces of the molding equipment.

A molding apparatus demonstrating objects and advantages of the present invention includes, in addition to a cooperating pair of molding members which define therebetween a shaping or molding compartment, a passage at the apex of said molding or shaping compartment for either pressure air or the application of a vacuum. Using the pressure air example, it is contemplated that at the conclusion of the molding operation that pressure air will be introduced into the shaping compartment at the noted strategic location (i.e. its apex) and that it will circumferentially radiate therefrom throughout said shaping compartment. In the process, the pressure air effectively lowers the temperature of the shaped fabric and thereby stabilizes it. Yet, it sweeps so comparatively rapidly through the shaping compartment that it does not have an adverse affect in lowering the temperatures of the shaping surfaces. With a vacuum, the air flow is in a reverse direction, but with the same beneficial effects.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
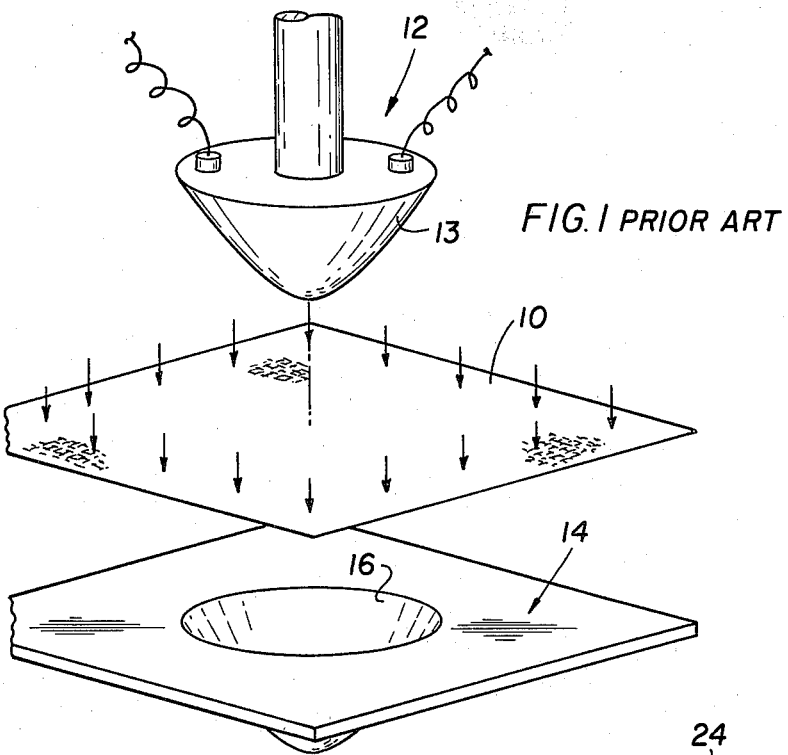
FIG. 1 is a perspective view illustrating prior art aspects of the molding apparatus involved herein.

As illustrated in FIG. 1, it is already well known, as for example according to U.S. Pat. No. 3,461,504, that thermoplastic material can be effectively imparted with a brassiere cup shape by a cooperating pair of molding members 12 and 14. More specifically, as generally understood, the molding procedure contemplates placement of the plastic fabric 10 in an interposed position and imparting a shape therein by having the upper or male mold 12, with its shaping surface 13, descend into the female molding cavity 16 and thus causing the plastic fabric 10 to assume the same conical shape as the shaping surfaces 13, 16.

Figure 2:
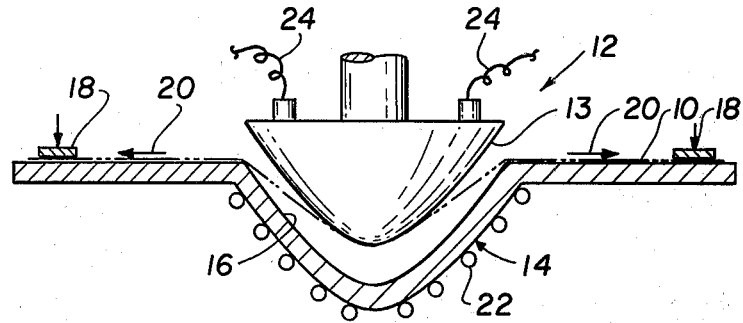
FIG. 2 is a side elevational view illustrating further details of the prior art apparatus.
Figure 3:
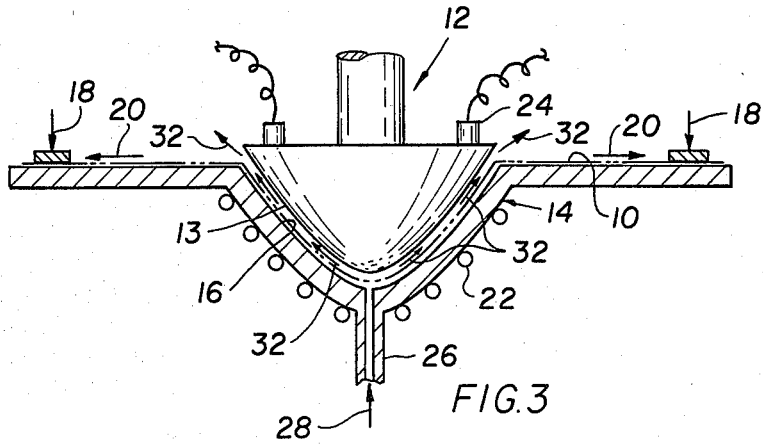
FIG. 3 is a side elevational view, similar to FIG. 2, but illustrating the inventive improvements hereof.

As is perhaps best appreciated from FIG. 2, it is during the closing of mold member 12 within mold member 14 that the plastic fabric 10 is stretched about the conical shape 13. For present purposes, it is important to note that the fabric 10 is held along its peripheral edge by a suitable holding clamp 18, and that one consequence of the stretching of the fabric is that forces 20 are induced in the fabric, in the directions indicated. Energization of heating coil 22 in turn heats mold 14 and, upon closing of the molds 12, 14, this heat is transferred to the fabric 10. The upper mold 12 may also be electrically energized, via conductors 24, to also contribute to heat transfer to the plastic fabric 10. The application of heat results, in a well understood manner, in producing a permanently modified shape in the plastic fabric. The shape, of course, is that of a traditional brassiere cup, namely the conical shape similar to that of the shaping surfaces 13 and 16.

The applied heat, as noted, results in the plastic fabric 10 assuming permanently the shape imparted to it by the closing of the mold 12 within the mold 14. This heat also to some extent relieves the stresses set up in the fabric 10 by the forces 20. These forces 20, however, are not relieved entirely in the molded shape. That is, the portion of the fabric which comprises the shape produced in the shaping compartment which is bounded between the molding or shaping surfaces 13 and 16 is under some stress until the thermoplastic material is fully cooled.

An important contribution of the present invention is the recognition of the foregoing, and also of the need for providing means, to be now described, for obviating any adverse affect of these stresses on the molded shape. Specifically, in prior art practice, these unrelieved stresses produced changes in the size of the molded shape and thereby prevented the molding of accurately sized brassiere cups, and it is this phenomenon which is obviated. More particularly, in accordance with the present invention, there is provided an air passage connection 26 between an appropriate source of pressure air 28 and the apex 30 of the shaping or molding compartment of the molding equipment. Using pressure air at a pressure in the range of 50 to 120 lbs. per square inch, and injecting the same at the strategic location 30 results in circumferentially radiating air flow, identified by the arrows 32, throughout the shaping compartment. That is, the pressure air 32 sweeps through the shaping compartment and is effective in chilling, and thus stabilizing, the molded fabric 10 within the shaping compartment bounded by the shaping surfaces 13, 16 even before the mold 12 is parted from the mold 14. Thus, while the fabric 10 is still under the holding influence of the cooperating molds 12, 14, the molded shape is lowered to a temperature at which the plastic fibers of the fabric 10 solidify. It has been found in practice that using the air sweep 32 it is possible to produce to accurate dimension a conical shape in the plastic fabric 10 which, without said air sweep, was not possible. Also, by using an air sweep 32, it has been found that there is an optimum minimum chilling of the actual molding surfaces 13 and 16 so that in the subsequent molding operation these shaping surfaces are almost at the required proper molding temperatures and require little additional heating for molding or shaping operation. Specifically, the pressure of the air 32 carries it comparatively rapidly through the shaping compartment without chilling effect on the surfaces 13, 16. This is not so when using a refrigerant or chilling medium to stabilize the molded fabric while the molds 12, 14 are still in their closed position.

It is within the contemplation of the present invention to produce an air sweep 32 in a reverse direction than that just described, but with the same stabilizing effect on the molded fabric 10. This is achieved merely by connecting the air passage 26 to a vacuum-producing apparatus (not shown). In this instance, the air 32 enters the mold cavity 16 through the circular opening between the upper portions of the female cavity 16 and male shape 13, and exits therefrom through the air passage 26.

A latitude of modification, change and substitution is intended in the foregoing disclousre and in some instances some features of the invention will be employed without a corresponding use of other features. Accordingly, it is appropriate that the appended claims be construed broadly and in a manner consistent with the spirit and scope of the invention herein.

What is claimed is:

1. An apparatus for molding a brassiere cup shape in a plastic fabric comprising a first body having a shaping surface bounding a conical volume serving as one molding member, a vertically reciprocating second body having a conically shaped surface serving as another molding member and arranged for descending movement into said conical volume in close proximate relation to said shaping surface of said first body so as to define a shaping compartment of conical configuration between said molding members, and pressure air means operatively connected to inject pressure air into said shaping compartment at the apex of said conical configuration thereof at the conclusion of the molding operation of said molding members, whereby said injected pressure air radiates from said point of entry circumferentially throughout said conical shaping compartment to stabilize the shaped fabric therein preparatory to the parting of said molding members.

* * * * *